United States Patent [19]

Leyrer

[11] Patent Number: 5,729,713
[45] Date of Patent: Mar. 17, 1998

[54] DATA PROCESSING WITH FIRST LEVEL CACHE BYPASSING AFTER A DATA TRANSFER BECOMES EXCESSIVELY LONG

[75] Inventor: Thomas Leyrer, Freising, Germany

[73] Assignee: Texas Instruments Incorporated, Dallas, Tex.

[21] Appl. No.: 411,257

[22] Filed: Mar. 27, 1995

[51] Int. Cl.⁶ .................................................. G06F 12/12
[52] U.S. Cl. .................................... 395/465; 395/445
[58] Field of Search ................................ 395/449, 465, 395/466, 452, 453, 445, 468, 877, 250

[56] References Cited

U.S. PATENT DOCUMENTS

| | | | |
|---|---|---|---|
| 4,268,907 | 5/1981 | Porter et al. | 395/465 |
| 4,433,374 | 2/1984 | Hanson et al. | 395/465 |
| 4,500,954 | 2/1985 | Duke et al. | 395/465 |
| 4,701,844 | 10/1987 | Thompson et al. | 395/446 |
| 4,740,889 | 4/1988 | Motersole et al. | 395/465 |
| 4,942,518 | 7/1990 | Weatherford et al. | 395/800 |
| 5,247,639 | 9/1993 | Yamahata | 395/465 |
| 5,301,295 | 4/1994 | Leary et al. | 395/452 |
| 5,371,872 | 12/1994 | Larsen et al. | 395/445 |
| 5,390,299 | 2/1995 | Rege et al. | 395/250 |
| 5,473,756 | 12/1995 | Traylor | 395/250 |
| 5,537,552 | 7/1996 | Ogasawara et al. | 395/250 |
| 5,539,895 | 7/1996 | Bishop | 395/465 |
| 5,561,823 | 10/1996 | Anderson | 395/872 |
| 5,581,731 | 12/1996 | King et al. | 395/471 |
| 5,594,868 | 1/1997 | Nakagoshi et al. | 395/200.16 |
| 5,625,793 | 4/1997 | Mirza | 395/465 |

OTHER PUBLICATIONS

Bates, Ken, "I/O subsystem performanc; cache implemented in the HSC can dramatically affect disk drive performance", DEC Professional, v12, n1, p.40(7), Jan. 1993.

*Primary Examiner*—Tod R. Swann
*Assistant Examiner*—Christopher S. Chow
*Attorney, Agent, or Firm*—Gerald E. Laws; C. Alan McClure; Richard L. Donaldson

[57] ABSTRACT

The hit rate of a cache memory (43) is improved by monitoring data transfer commands on a command bus (51) by Non-Cache circuitry (45A). Cache data replacements are inhibited after a consecutive sequence of data transfers which exceeds a threshold number of data transfers are detected by Non-Cache circuitry (45A). The threshold number is selected to be an amount of data transfers which is large enough to imply that a large block of data is being transferred. Such large data blocks tend to flush the cache and reduce subsequent cache hit rate. Other sources of cache inhibit signals may be included, such as System Cache Enable (SKEN), to inhibit caching for other reasons, such as when non-cacheable areas such as video memory are being accessed. Inhibiting useless cache data replacements in this manner improves hit rate and reduces power consumption.

13 Claims, 1 Drawing Sheet

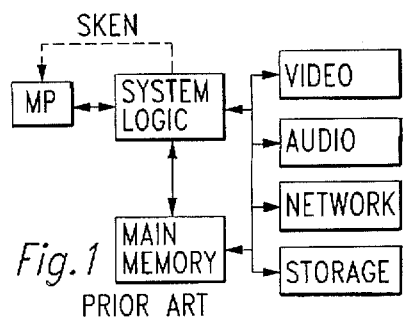
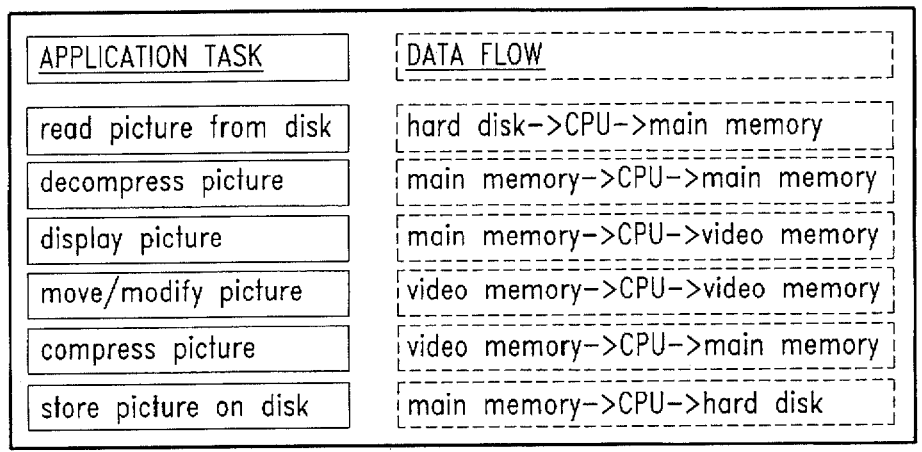
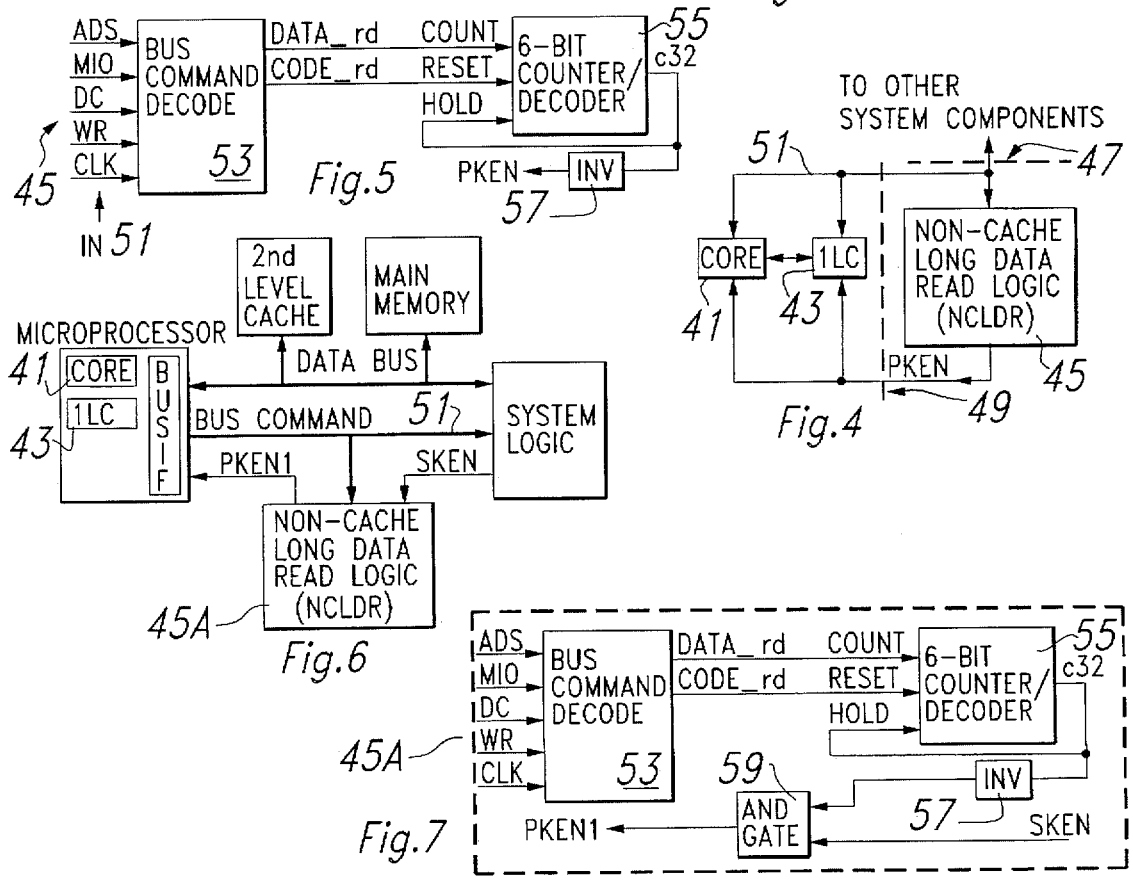

DATA PROCESSING WITH FIRST LEVEL CACHE BYPASSING AFTER A DATA TRANSFER BECOMES EXCESSIVELY LONG

FIELD OF THE INVENTION

The invention relates generally to microprocessor based data processing systems and, more particularly, to systems which have various levels of data storage including a first level cache and which use the microprocessor to transfer and modify long data blocks.

BACKGROUND OF THE INVENTION

Emerging trends in microprocessor based systems like video and audio processing for multimedia applications and peripheral adaptation on the microprocessor bus require a very efficient processor-to-memory interface. FIG. 1 depicts a common architecture of a computer system. The microprocessor (or CPU) MP including a first level cache resides on the mainboard together with the system logic, main memory and adapter cards for peripherals. Optionally the mainboard offers a second level cache (not shown) to speed up system performance. Most of today's Personal Computers (PC) and Engineering Workstations are based on a two-level cache memory design.

With the faster growing speed evaluation on process technology compared to processor bus speed, the internal memory bus of the processor is typically 2–3 times as fast as the external memory bus, so the performance of the on-chip first level cache (1LC) becomes more important. The overall goal of a first level cache is to supply the processor core with information from on-chip memory with no wait states. The information transferred to the core can include instructions and data, and data can be written from the core to the system. Enhanced cache architectures are using a write-back mechanism to update data in the first level cache without updating the external memory system. This allows the core to write data into the first level cache without wait states. The slower external memory is updated from the core only if the data written by the core into the first level cache gets replaced by new data and would otherwise be lost. The processor works most efficiently when more than 90% of read and write requests match the content of the 1LC. A high hit rate of more than 90% can be achieved on processor benchmark programs using data calculation and transportation in blocks smaller than the size of the 1LC. With application software the hit rate of the 1LC is typically less than 90% due to larger programs and data blocks which exceed the size of the 1LC. It is of course important for the system performance to keep the hit rate of the 1LC as high as possible.

To keep pace with larger data blocks transferred from and to the peripherals, several techniques are used to increase the data throughput. For example, peripheral devices such as graphic adapters and hard disk controllers are connected to the microprocessor (MP) local bus to use the full bandwidth of the processor bus. In addition large memory buffers or cache memories are implemented on the peripherals to increase the data throughput of the system. For example, a hard disk might implement a hard disk (HD) cache. There are also programs that use a part of the main memory as a software (SW) cache to store frequently used data. The size of such caches is in general more than 10 times the size of the first level cache (1LC).

FIG. 2 shows a typical example of memory levels involved in hard disk operations with related memory size and maximum transfer rate. The second level cache (2LC) is based on static memory (SRAM) devices which have a faster access time than the dynamic memory (DRAM) devices of the main memory. Thus the SRAM can respond to CPU requests with no wait states whereas the DRAM of the main memory typically requires 1 or more wait states. Another memory level is inserted by hard disk cache programs that use part of the main memory as a software cache to store frequently used memory blocks from the hard disk drive. Larger disk drives use an on-drive cache memory (hard disk cache) which stores data blocks in advance. The slowest transfer rate in the FIG. 2 memory model comes from the magnetic disk drive which is limited by mechanical rotation. In general there is a compromise between memory size and transfer rate. The various memory levels mentioned above are used to improve the overall system performance. However, the function of data transfer from the hard disk to the MP could be also achieved without any cache memory, but at the cost of lower system performance.

FIG. 3 shows the basic data flow required to execute a typical application in the system of FIG. 1. This example indicates that for all tasks of the application the CPU is the device controlling the data flow. Every time the CPU reads information from the external system, the information is allocated in the 1LC. Transfers of data blocks which are multiple times the size of the 1LC (which is the case for all transfers shown in FIG. 3) have the following effect: 1LC gets completely filled with data which will be replaced by new data blocks before there is a CPU request on the same location; the effective 1LC hit rate is near 0% during transfers of large data blocks; and 1LC with write-back mode has to update dirty data from 1LC into slower external memory before the whole 1LC is filled with data.

It is therefore desirable to improve the 1LC hit rate during large block transfers to the CPU, and to reduce the need to update dirty data to external memory during large block transfers to CPUs having a write-back feature.

A data processing arrangement according to the invention prevents a long data read sequence from being allocated to a memory level if the block size of the data read sequence exceeds the size of the memory level.

BRIEF DESCRIPTION OF THE DRAWINGS

FIG. 1 is a block diagram of a conventional data processing system.

FIG. 2 shows size and data transfer characteristics of various memory levels within a data processing system such as shown in FIG. 1.

FIG. 3 illustrates the data flow within the data processing system of FIG. 1 during execution of various application tasks.

FIG. 4 is a block diagram which illustrates how non-cache long data read (NCLDR) logic according to the present invention can be applied to the core logic and first level cache of a microprocessor.

FIG. 5 diagrammatically illustrates one exemplary embodiment of the NCLDR logic of FIG. 4.

FIG. 6 is a block diagram which illustrates how another exemplary embodiment of the NCLDR logic is used in a data processing system.

FIG. 7 diagrammatically illustrates the exemplary NCLDR logic of FIG. 6.

DETAILED DESCRIPTION

As an example for describing the invention, an on-chip 1LC is considered with a cache size of 16 KBytes and a write-back mode. The CPU controls the memory allocation on 1LC with a cache enable signal. Once a long data read sequence is recognized, the control logic of the invention disables memory allocation on 1LC by driving the cache enable signal inactive. This method avoids "flushing" the 1LC with ineffective data. In addition, the most frequently used instruction and data patterns remain in 1LC, the fastest memory of the computer system. Data which is flagged as dirty in the 1LC does not need to be updated into slower external memory.

Microprocessors conventionally have the capability to execute data block instructions. For example, microprocessors based on the so-called x86 architecture have an instruction prefix called REP which allows the repetition of a data transfer command. In a 16 bit device driver software the data transfer command can be repeated 65536 times, which results in a data block size of up to 512 KBytes for a single instruction. The present invention is applicable with microprocessors that have this capability of data block transfers with single instructions. Evaluation of conventional peripheral device driver and software cache routines confirms that data blocks of 8 KBytes to 64 KBytes are typically transferred in combination with the REP instruction prefix during execution of tasks such as those shown in FIG. 3.

In contrast, block transfers of a few hundred bytes up to about 8 K Bytes (half the size of a 16 K Byte 1LC) are used very seldom and have negligible effect on the system performance whether they are allocated in 1LC or not. When a program jumps to and returns from subroutines, the CPU internal registers are typically saved or restored with a single instruction, e.g. push or pop all registers (POPA instruction on x86 architectures). The size of the data blocks involved in such program flow control are dependent on the operating system. For a 16 bit operating system, the block size of this kind of data transfer is typically less than 64 bytes.

Based on the evaluation above, the size of a data block relative to the 1LC size can be predicted by counting the consecutive data read bus cycles. Once the count exceeds the block size typically used for program flow control, the probability of a data block read sequence at least as large as the 16 KByte 1LC of this example is very high. The probability of at least an 8 KByte sequence (half the size of the 16 K Byte 1LC of this example) is even higher.

FIG. 4 is a block diagram which illustrates an example of the present invention. FIG. 4 shows a core 41 and a first level cache 43 of a microprocessor, and a bus 51 for transferring information such as control signals, data, addresses and instructions between the microprocessor and system components external to the microprocessor, such as the system logic, main memory and other peripherals illustrated in FIG. 1. Also connected to bus 51 is non-cache long data read (NCLDR) logic 45. The logic 45 is responsive to information received from bus 51 to produce a processor cache enable signal PKEN which indicates to the microprocessor whether or not the first level cache 43 is to be utilized to cache a block transfer. FIG. 4 also illustrates that the logic 45 may be implemented on-chip with the core 41 and first level cache 43 of the microprocessor, or may be alternatively implemented externally of the microprocessor. More specifically, the dashed lines 47 and 49 illustrate alternative boundaries between the microprocessor and the remainder of the data processing system. If the logic 45 is implemented on-chip with the microprocessor, then the microprocessor/system boundary is defined by dashed line 47 in FIG. 4. If the logic 45 is implemented externally of the microprocessor, then the microprocessor/system boundary is defined by the broken line at 49 in FIG. 4. As will be apparent from the following description, the logic 45 functions the same whether it is implemented on-chip with the microprocessor or off-chip with the remainder of the system components.

FIG. 5 shows one example of the NCLDR logic. The 'BUS COMMAND DECODE' block 53 has several CPU control signals from bus 51 as input. The address strobe signal (ADS) indicates that the CPU is starting an external bus cycle. This bus cycle is defined by the three control signals memory/io (MIO), data/code (DC) and write/read (WR). The latter three control signals are valid with ADS. The clock input CLK is the reference signal to sample the signals and check their status. The logic in this block 53 decodes two different types of bus cycles. The data read (data__rd) output signal indicates that the CPU requests data information from the external system. The code read (code__ rd) output signal indicates that the CPU fetches code information, i.e. instructions. All other bus cycles such as input/output cycles, write cycles or special cycles are not decoded by this block 53. The output signals from logic block 53 feed the input of a '6 BIT COUNTER/DECODER' block 55. FIG. 5 shows that the data__rd signal is connected with the count input of block 55 and the code__rd signal is connected with the reset input of block 55.

The 6-bit counter in block 55 has three input signals with the following functions. The count input increases the counter state by one only when the hold input is not asserted. The reset input sets the counter state to zero independent of the other inputs. The counter remains in its current state if hold is asserted. The hold input of logic block 55 is connected with counter state 32 (c32) output from the block 55. The active high c32 output thus represents the maximum attainable count (32) in this embodiment. This means that the counter counts up to state 32 on data read cycles and remains at this state until a code read cycle is initiated by the CPU. So there must be 32 consecutive data read cycles without an instruction fetch (which would activate code__rd and thus reset the counter) to activate the c32 signal. The c32 signal is inverted at 57 to produce the PKEN signal, and the microprocessor will not allocate any read cycles to 1LC while PKEN is low. Upon the next code read cycle, code__rd will reset the counter to drive c32 low and PKEN high, thus permitting read cycle allocation to 1LC until the next instance of 32 consecutive data read cycles without an instruction fetch. In a 16 bit operating system, a data block of 64 bytes is required to activate the c32 signal (2 bytes/ read cycle X 32 read cycles).

Referring again to FIG. 1, the system logic in many conventional computer systems generates a system cache enable signal SKEN which is input to the microprocessor and which normally enables the first level cache of the microprocessor, but also disables the first level cache when the microprocessor is accessing non-cacheable areas such as video memory. Thus, if the NCLDR logic is implemented externally of the microprocessor, and if the SKEN signal is provided as shown in FIG. 1, then the output of inverter 57 can be used to gate the SKEN signal and thereby provide a suitable PKEN1 signal to the microprocessor, as shown at 45A in FIGS. 6 and 7. The cache enable signal to the processor (PKEN1) is the output of an AND gate 59 which has the system cache enable (SKEN) signal and the inverted version of the c32 signal as input. When the counter state reaches state 32 indicated by an active high level on c32, then PKEN1 is driven low by the inverted c32 signal output from inverter 57, and the 1LC does not allocate any data from read cycles until the next code fetch.

The exemplary logic 45 and 45A of FIGS. 5–7 can be implemented with, for example, a single programmable logic array (PLA) device, which PLA can be located within the system logic chip set, or separately therefrom as in FIG. 6. Although it is more cost effective to integrate the logic 45 into the microprocessor where the 1LC is located, the system performance is not affected regardless of whether logic 45 is integrated into the microprocessor, or logic 45 or 45A is provided externally of the microprocessor either within the system logic chip set or elsewhere.

In view of the foregoing, it should be clear that the present invention: (1) increases computer system performance with easy implementation by suppressing CPU first level cache on long data read sequences; (2) gets more efficient on systems using a) CPU local bus peripherals (video, audio, mass storage, network), b) Multimedia applications, c) CPUs with internal multiple clock operation (2–3 times as fast as external memory bus), d) CPUs with on chip write back cache, e) 2nd level cache (>64 kByte), f) large main memory (>8 Mbyte), and g) software cache for peripherals; and (3) reduces CPU power consumption on long data read sequences (no 1LC operations).

Although exemplary embodiments of the present invention are described above, this description does not limit the scope of the invention, which can be practiced in a variety of embodiments.

What is claimed is:

1. A data processing device, comprising:

a cache memory circuit;

a bus for providing control information which indicates that a data transfer of a block of data into said data processing device is occurring; and logic circuitry having an input connected to said control information, said logic circuitry having an output connected to said cache memory circuit to disable said cache memory circuit from storing therein data from said block after said block reaches a predetermined block size during said data transfer.

2. A data processing system, comprising:

a cache memory, a data source, and a data path connected therebetween;

a bus for providing control information which indicates that a data transfer of a block of data from said data source into said cache memory is occurring; and logic circuitry having an input connected to said control information, said logic circuitry having an output connected to said cache memory to disable said cache memory from storing therein data from said block after said block reaches a predetermined block size during said data transfer.

3. The data processing system of claim 2, wherein said cache memory is provided in an integrated circuit together with a data processing core.

4. The data processing system of claim 3, wherein said logic circuitry is provided in said integrated circuit.

5. The data processing system of claim 3, wherein said logic circuitry is provided separately from said integrated circuit.

6. A method of controlling the hit rate of a cache memory, comprising;

monitoring a data transfer of a block of data into the cache memory;

determining whether the block being transferred reaches a predetermined size; and disabling storage of the data block in the cache memory after the block reaches the predetermined size.

7. A method of controlling power consumption in a data processing device having a cache memory, comprising:

monitoring a data transfer of a block of data into the data processing device;

determining whether the block being transferred reaches a predetermined size; and selectively reducing the power consumed by the cache memory, including disabling the cache memory from storing therein the block being transferred after the block being transferred reaches the predetermined size.

8. A data processing device, comprising:

a cache memory circuit;

a bus for providing control information which indicates when a data transfer into said data processing device is occurring and also indicates when an instruction transfer into said data processing device is occurring; and logic circuitry having an input connected to said control information, said logic circuitry having an output connected to said cache memory circuit to disable said cache memory circuit from storing therein any information transferred into said data processing device after a predetermined number of data transfers occurs consecutively without an occurrence of an intervening instruction transfer, such that data transfers of a greater number than the predetermined number occurring between instruction transfers are not stored in the cache memory.

9. A method of controlling the hit rate of a cache memory, comprising:

monitoring data transfers into the cache memory and monitoring instruction transfers into the cache memory;

determining whether a predetermined number of data transfers occurs consecutively without an occurrence of an intervening instruction transfer; and disabling storage in the cache memory after the predetermined number of data transfers occurs consecutively without an occurrence of an intervening instruction transfer, such that data transfers of a greater number than the predetermined number occurring between instruction transfers are not stored in the cache memory.

10. A data processing system, comprising:

a cache memory, an information source, and a data path connected therebetween;

a bus for providing control information which indicates when a data transfer from said information source to said cache memory is occurring and also indicates when an instruction transfer from said information source to said cache memory is occurring; and logic circuitry having an input connected to said control information, said logic circuitry having an output connected to said cache memory to disable said cache memory from storing therein any information transferred thereto from said information source after a predetermined number of data transfers occurs consecutively without an occurrence of an intervening instruction transfer, such that data transfers of a greater number than the predetermined number occurring between instruction transfers are not stored in the cache memory.

11. The data processing system of claim 10, wherein said cache memory is provided in an integrated circuit together with a data processing core.

12. The data processing system of claim 11, wherein said logic circuitry is provided in said integrated circuit.

13. The data processing system of claim 11, wherein said logic circuitry is provided separately from said integrated circuit.

* * * * *